March 10, 1931.                F. LECHLER                    1,796,110
          PROCESS AND APPARATUS FOR EFFECTING CHEMICAL
                     REACTIONS BETWEEN GASES
                 Filed Sept. 13, 1927        2 Sheets-Sheet 1
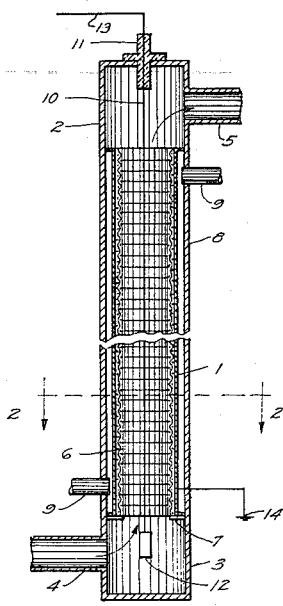
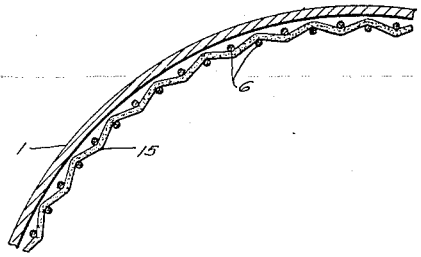
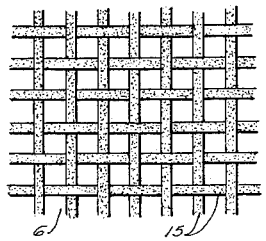
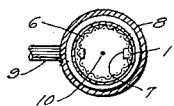
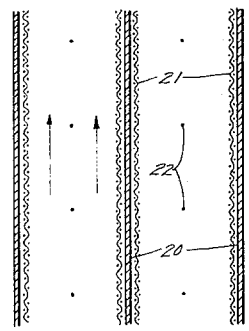
INVENTOR.
Fritz Lechler
BY *Arthur P. Knight and Alfred W. Knight*
ATTORNEYS.

March 10, 1931.　　　F. LECHLER　　　1,796,110
PROCESS AND APPARATUS FOR EFFECTING CHEMICAL
REACTIONS BETWEEN GASES
Filed Sept. 13, 1927　　2 Sheets-Sheet 2
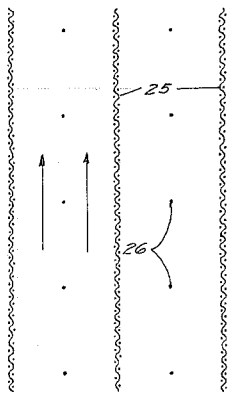
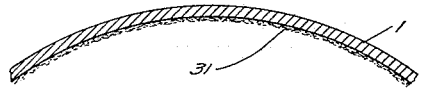
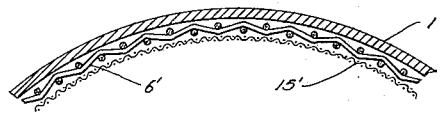
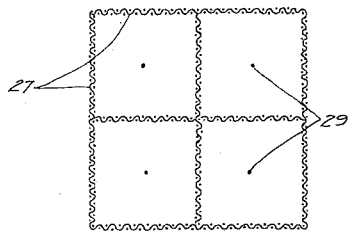
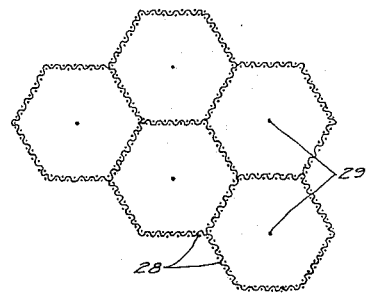
INVENTOR.
Fritz Lechler
BY
ATTORNEYS.

Patented Mar. 10, 1931

1,796,110

UNITED STATES PATENT OFFICE

FRITZ LECHLER, OF FRANKFORT-ON-THE-MAIN, GERMANY, ASSIGNOR TO INTERNATIONAL PRECIPITATION COMPANY, OF LOS ANGELES, CALIFORNIA, A CORPORATION OF CALIFORNIA

PROCESS AND APPARATUS FOR EFFECTING CHEMICAL REACTIONS BETWEEN GASES

Application filed September 13, 1927, Serial No. 219,319, and in Germany November 24, 1926.

This invention relates to methods and apparatus for promoting or bringing about reactions between gases or vapors and particularly such reactions as are facilitated by means of contact substances or catalysts.

The principal object of the invention is to provide for promoting such reactions by the combined action of contact substances and silent electric discharge, in such manner that the electric discharge acts not only to directly promote the reaction, but also to create an electric wind in the gas so as to bring the gases into more effective contact with the contact substance.

The invention may be applied to the promotion of any reaction between materials in the gaseous phase, which is facilitated or promoted by the presence of a catalyptic contact substance, for example to the oxidization of sulphur dioxide to form sulphur trioxide as in the well-known contact process of sulphuric acid manufacture or to the chlorination or hydrogenation of hydrocarbons or other organic gases, and the particular contact substance employed will be selected in each case as that which best promotes the particular reaction at hand.

The accompanying drawings illustrate apparatus according to this invention and referring thereto:

Fig. 1 is a vertical section of such an apparatus.

Fig. 2 is a horizontal section on line 2-2 in Fig. 1.

Fig. 3 is an enlarged sectional view of a portion of the apparatus shown in Fig. 2.

Fig. 4 is a face view of a portion of the contact screen shown in Fig. 3.

Figs. 5 to 8 are partial horizontal sections of modified forms of apparatus.

Figs. 9 and 10 are views similar to Fig. 3 showing other modified forms of apparatus.

The apparatus shown in Figs. 1 and 2 comprises a tubular metallic casing 1 providing a gas passage and reaction chamber, and extending between top and bottom headers 2 and 3 respectively. Means are provided for supplying the gas to be treated to one of said headers and for conducting the treated gases away from the other header, such means comprising for example inlet pipe 4 connected to header 3 and outlet pipe 5 connected to header 2. Within the casing 1 and slightly spaced therefrom is disposed a pervious iron or other metallic screen 6, said screen being tubular in form and being supported in any suitable manner as by means of lugs or brackets 7. Casing 1 may be provided with a jacket 8 for controlling the temperature of the reaction chamber, for example by circulating any suitable heating or cooling medium therethrough by means of pipes 9.

Such screen may be provided with a coating 15 of the particular contact substance to be employed, such coating being advantageously provided by using a metallic screen covered with fibrous material such as asbestos impregnating with the contact material. For this purpose the screen may be formed of asbestos covered wire and may be impregnated with the contact substance for example as in ordinary methods of prepared asbestos for use in the contact process of sulphuric acid manufacture.

Suspended centrally within the gas passage is a discharge electrode 10 consisting for example of a fine wire led into the apparatus through, and supported by, insulating bushing 11, and tensioned by means of weight 12. The discharge electrode 10 may be connected by wire 13 to any suitable apparatus for maintaining the same at a high electrical potential with respect to the screen 6, the other side of said source of electrical potential being grounded and the screen 6 or casing 1 being also grounded as indicated at 14 to complete the circuit. The means employed for creating the necessary electrical potential may be of any suitable type and may for example comprise a transformer and mechanical rectifier such as ordinarily used in the art of electrical precipitation.

In carrying out the process in the above described apparatus the gases to be treated, consisting for example of a mixture containing sulphur dioxide and oxygen, are introduced into one end of the gas passage 1 and passed longitudinally therethrough. In passing through such passage the gases are not only simultaneously subjected to the combined action of the silent electric discharge maintained therein due to the high potential difference between discharge electrode 10 and screen 6 which constitutes a passive electrode, and of the contact substance 9 on said screen, but also the electric wind created by such electric discharge causes the gases to be repeatedly driven outwardly toward and through said screen so as to be repeatedly brought into close contact with such contact substance. This effect of the electric wind is due to the fact that the passive electrode or screen is arranged opposite the discharge electrode, so that the convection of the gases under the action of the electric discharge, is directly toward the passive electrode and the catalytic material thereon.

Many modifications are possible in the form of apparatus. For example the gas passages may be provided between flat plates 20 at either side or both sides of which are provided screens 21 coated with a contact substance as above described, suitable discharge electrodes 22 being also provided centrally between plates. In this apparatus the gas may be passed between and longitudinally of the contact screens. The form of apparatus shown in Fig. 6 is similar to that shown in Fig. 5 except that instead of providing a plate with a pervious screen on each side thereof, only a single screen coated with suitable contact substance is provided as indicated at 25, between each row of discharge electrode members 26.

In the forms of the invention shown in Figs. 7 and 8 the plates or impervious walls are also omitted, the contact screens being arranged to form either square ducts as indicated at 27 in Fig. 7 or hexagonal ducts as indicated at 28 in Fig. 8, and the discharge electrode wires 29 being disposed centrally within said ducts in either case.

As illustrated in Fig. 9, the apparatus shown in Figs. 1 and 2 may be modified by providing a coating of suitable contact material, such as platinized asbestos, directly on the inner wall of casing 1, as indicated at 31. Or, as shown in Fig. 10, the wire screen 6′ may be provided with a pervious mat or sheet 15′ of contact material such as platinized asbestos, at either the inner or outer side thereof, through which the gas driven outwardly by electric wind is permitted to pass.

The process may be carried out in any of the above described modifications in substantially the same manner and with the same advantages as in the form of apparatus first described.

I claim:

1. The process of effecting chemical reactions between gases which comprises subjecting such gases to the combined action of a silent discharge and a catalytic agent in such manner that the electric wind created by such discharge causes the gases to be brought into intimate contact with the catalytic agent.

2. The process of effecting chemical reactions between gases which comprises passing such gases through a silent electric discharge and in contact with a catalytic agent, while maintaining such a relation between the direction of the electric discharge and the position of the catalytic agent that the electric wind created by such discharge acts to bring said gases into contact with said catalytic agent.

3. An apparatus for effecting chemical reactions between gases, comprising gas passage means, discharge electrode means and passive electrode means for maintaining a silent electric discharge within said gas passage means, and a body of catalytic material disposed on said passive electrode means, said passive electrode means and the catalytic material thereon being arranged opposite the discharge electrode means in such manner that the electric wind created by the electric discharge serves to promote contact of gas passed through said gas passage means with said catalytic material.

4. An apparatus as set forth in claim 3, said body of catalytic material being pervious.

5. An apparatus for effecting chemical reaction between gases, comprising discharge electrode means, passive electrode means and arranged opposite the discharge electrode means, said discharge electrode means being insulated from said passive electrode means, means for maintaining a silent electric discharge from said discharge electrode means toward said passive electrode means, means for passing the gases to be treated between said discharge electrode means and said passive electrode means and a body of suitable catalytic material adjacent said passive electrode means, said passive electrode means and the catalytic material adjacent same being arranged opposite the discharge electrode means in such manner that the electric wind caused by the electric discharge is directly from the discharge electrode toward the passive electrode and serves to promote contact of the gases with the catalytic means adjacent thereto.

6. An apparatus as set forth in claim 5, said body of catalytic material being pervious to permit circulation of gas therethrough.

In testimony whereof I have hereunto subscribed my name this seventeenth day of August, 1927.

FRITZ LECHLER.